(12) United States Patent
Loccufier et al.

(10) Patent No.: US 8,227,047 B2
(45) Date of Patent: Jul. 24, 2012

(54) RADIATION CURABLE INKJET FLUIDS AND INKS IMPROVED FOR PHOTOYELLOWING

(75) Inventors: Johan Loccufier, Zwijnaarde (BE); Ivan Hoogmartens, Wilrijk (BE)

(73) Assignee: Agfa Graphics NV, Mortsel (BE)

( * ) Notice: Subject to any disclaimer, the term of this patent is extended or adjusted under 35 U.S.C. 154(b) by 181 days.

(21) Appl. No.: 12/739,001

(22) PCT Filed: Oct. 22, 2008

(86) PCT No.: PCT/EP2008/064262
§ 371 (c)(1),
(2), (4) Date: Apr. 21, 2010

(87) PCT Pub. No.: WO2009/053376
PCT Pub. Date: Apr. 30, 2009

(65) Prior Publication Data
US 2010/0330296 A1    Dec. 30, 2010

Related U.S. Application Data

(60) Provisional application No. 60/982,472, filed on Oct. 25, 2007.

(30) Foreign Application Priority Data

Oct. 24, 2007 (EP) .................................... 07119179

(51) Int. Cl.
C09D 11/10 (2006.01)
C08F 2/46 (2006.01)

(52) U.S. Cl. ............. 427/466; 522/10; 522/16; 522/30; 522/75; 522/83; 522/181

(58) Field of Classification Search .................. 427/466; 522/16, 39, 28, 83, 75, 181, 10, 182
See application file for complete search history.

(56) References Cited

U.S. PATENT DOCUMENTS

| | | |
|---|---|---|
| 3,888,765 A | 6/1975 | Bolk |
| 5,011,555 A | 4/1991 | Sager |
| 5,681,438 A | 10/1997 | Proulx |
| 6,310,115 B1 | 10/2001 | Vanmaele et al. |
| 6,814,791 B2 | 11/2004 | Moore et al. |
| 7,104,642 B2 | 9/2006 | Takabayashi |
| RE40,847 E * | 7/2009 | Vanmaele et al. ............ 427/466 |
| 8,133,551 B2 * | 3/2012 | Claes ............................ 427/511 |
| 2003/0021961 A1 | 1/2003 | Ylitalo et al. |
| 2003/0199655 A1 * | 10/2003 | Yurugi et al. ................. 526/320 |
| 2004/0163570 A1 | 8/2004 | Vanmaele et al. |
| 2006/0213368 A1 | 9/2006 | Kita et al. |
| 2007/0139426 A1 * | 6/2007 | Greco et al. .................. 345/531 |
| 2009/0000508 A1 * | 1/2009 | Edison et al. ................ 106/31.6 |
| 2012/0113201 * | 5/2012 | Kagose et al. ............... 347/102 |

FOREIGN PATENT DOCUMENTS

| | | |
|---|---|---|
| DE | 3126433 A1 | 1/1983 |
| DE | 3417248 A1 | 11/1985 |
| EP | 0 036 075 A1 | 9/1981 |
| EP | 1 344 805 A1 | 9/2003 |
| EP | 1 671 805 A2 | 6/2006 |
| EP | 1 705 229 A1 | 9/2006 |
| EP | 1 992 400 A1 | 11/2008 |
| FR | 2 647 512 A1 | 11/1990 |
| JP | 06-218239 A | 8/1994 |
| WO | 00/30856 A1 | 6/2000 |
| WO | 02/061001 A1 | 8/2002 |
| WO | 2005/026270 A1 | 3/2005 |

OTHER PUBLICATIONS

Official Communication issued in International Patent Application No. PCT/EP2008/064262, mailed on Feb. 11, 2009.
Lal et al. "Effect of Type of Catalyst on Structure of Poly (Beta-Vinyloxyethyl Methacrylate)", Journal of Polymer Science, Interscience Publishers, vol. XLIV, 1960, pp. 523-529.

* cited by examiner

*Primary Examiner* — Susan W Berman
(74) *Attorney, Agent, or Firm* — Keating & Bennett, LLP

(57) ABSTRACT

A radiation curable inkjet fluid includes a radiation curable composition including at least 25 wt % of a vinylether acrylate and at least 15 wt % of a polymerizable compound including at least three acrylate groups, each wt % being based upon the total weight of the radiation curable composition; and a photoinitiator including a tertiary amine group and 0 to 3 wt % of isopropylthioxanthone based upon the total weight of the radiation curable inkjet fluid. Also, an inkjet printing method using the radiation curable inkjet fluid.

12 Claims, No Drawings

RADIATION CURABLE INKJET FLUIDS AND INKS IMPROVED FOR PHOTOYELLOWING

CROSS-REFERENCE TO RELATED APPLICATIONS

This application is a 371 National Stage Application of PCT/EP2008/064262, filed Oct. 22, 2008. This application claims the benefit of U.S. Provisional Application No. 60/982,472, filed Oct. 25, 2007, which is incorporated by reference herein in its entirety. In addition, this application claims the benefit of European Application No. 07119179.5, filed Oct. 24, 2007, which is also incorporated by reference herein in its entirety.

BACKGROUND OF THE INVENTION

1. Field of the Invention

This invention relates to radiation curable inkjet fluids and inks exhibiting a lower degree of photoyellowing and improved adhesion properties.

2. Description of the Related Art

In inkjet printing, tiny drops of ink fluid are projected directly onto an ink-receiver surface without physical contact between the printing device and the ink-receiver. The printing device stores the printing data electronically and controls a mechanism for ejecting the drops image-wise. Printing is accomplished by moving a print head across the ink-receiver or vice versa or both.

When jetting the inkjet ink onto an ink-receiver, the ink typically includes a liquid vehicle and one or more solids, such as dyes or pigments and polymers. Ink compositions can be roughly divided in:

water-based, the drying mechanism involving absorption, penetration and evaporation;
solvent-based, the drying primarily involving evaporation;
oil-based, the drying involving absorption and penetration;
hot melt or phase change, in which the ink is liquid at the ejection temperature but solid at room temperature and wherein drying is replaced by solidification; and
UV-curable, in which drying is replaced by polymerization.

It should be clear that the first three types of ink compositions are more suitable for an absorbing ink-receiver, whereas hot melt inks and UV-curable inks can also be printed on non-absorbing ink-receivers. Due to thermal requirements posed by hot melt inks on the substrates, especially radiation curable inks have gained the interest of the industry in inkjet printing applications.

The behaviour and interaction of a UV-curable ink on a substantially non-absorbing ink-receiver was found to be quite complicated compared to water-based inks on absorbent ink-receivers. In particular, a good and controlled spreading of the ink on the ink-receiver proved to be problematic and adhesion problems were observed on using different types of non-absorbing ink-receivers.

One way to approach these problems is to develop and use different ink sets for different types of substrates, but this is not a preferred solution since changing inks in the printer and print head is very time consuming and not really a viable solution for an industrial printing environment.

The adhesion may be influenced by using different polymerizable compounds, surfactants, binders and/or organic solvents. U.S. Pat. No. 6,814,791 (DOMINO PRINTING SCIENCES) discloses inkjet printing methods wherein the ink composition including methyl acetate as a solvent is printed upon substrates of propylene and ethylene. The use of a well-chosen solvent usually results in partial swelling or dissolution of the substrate surface which leads to better adhesion, but can also cause problems of blocked nozzles in the printhead due to evaporation of solvent.

It is known that the adhesion of radiation curable inks can also be promoted on polyvinyl chloride substrates when one or more monomers are used that are suitable for the swelling of the PVC substrate and which are selected from the group consisting of tetrahydrofurfuryl acrylate, 1,6-hexanediol diacrylate and N-vinyl caprolactam. However, adhesion on polycarbonate substrates is promoted when one or more monomers are used that are suitable for the swelling of the polycarbonate substrate and which are selected from the group consisting of 2-phenoxylethyl acrylate, 2-(2-ethoxyethoxy)ethyl acrylate and polyethyleneglycol diacrylate. As a consequence one has to make the "best possible" mixture of monomers suitable for both the swelling of polyvinyl chloride substrates and polycarbonate substrates. Often such a compromise, whereby acceptable adhesion is obtained on several ink-receivers by making a complex mixture of ingredients, has a negative effect on the dispersion stability of a pigmented inkjet ink.

Adhesion problems have also been associated with shrinkage of an ink-layer after radiation curing. In this aspect, cationic inks have been regarded to be superior in comparison to free radical polymerizable inks. EP 1705229 A (FUJI) discloses cationically polymerizable inkjet inks exhibiting good adhesion and storage stability.

U.S. Pat. No. 6,310,115 (AGFA) discloses radiation curable inkjet ink compositions including radiation curable monomers containing vinylether and acrylate functions, which can be cured both by cationic polymerization and free radical polymerization.

In free radical inkjet inks, high amounts of monofunctional acrylates are thought to be advantageous for adhesion. Both EP 1668084 A (SUN CHEMICAL) and U.S. Pat. No. 7,104,642 (KONICA MINOLTA) address adhesion and disclose radiation curable inkjet inks including monofunctional acrylate compounds in amounts of 65% by mass or more.

Instead of adapting the inkjet inks, it has become the general approach to modify the surface chemistry of the ink-receiver either by a pre-treatment such as plasma or corona treatment or by applying a suitable surface layer, a so-called primer.

Corona discharge treatment and plasma treatment increase the cost, complexity and maintenance of the equipment used to process the substrates. Substrates may contain significant impurities or irregularities that may interfere with the treatment of the substrate, and hence not result to the uniform spreading and adhesion of ink.

The other possibility is the application of a primer prior to jetting the inkjet inks. Generally, the surface layer is coated and dried or cured before jetting the inkjet ink as, for example, in the inkjet printing process in EP 1671805 A (AGFA) and US 2003021961 (3M), but it can also remain a wet, un-cured surface layer as in WO 00/30856 (XAAR).

Photoyellowing is a discoloration effect seen after curing due to decomposition of photoinitiators. This can be especially well observed for cyan and white radiation curable inks containing large amounts of isopropylthioxanthone type photoinitiators, which after printing and curing result in a greenish cyan respectively a yellowish white colour.

EP 0036075 (MERCK) and DE 3126433 (MERCK) disclose the use of specific mixtures of photoinitiators in the photopolymerisation of ethylenically unsaturated compounds to obtain polymers which experience only extremely low levels of yellowing.

US 2003199655 A1 (NIPPON SHOKUBAI) discloses in examples 75 and 76 inks containing about 80 parts of vinylether acrylate, 10 parts of trimethylolpropane triacrylate and 5 parts of 2-methyl-2-morpholino(4-thiomethylphenyl)propan-1-one.

US 2004163570 A1 (AGFA) discloses radiation curable ink compositions including at least one initiator and at least one polyhedral oligomeric silsesquioxane.

EP 1344805 A1 (AGFA) discloses radiation curable ink compositions for ink jet including a vinyletheracrylate.

EP 1358283 A1 (SERICOL) discloses ink jet inks including at least one multifunctional acrylate monomer, at least one vinyl ethermonomer, and at least one photoinitiator.

Therefore, a need continues to exist for radiation curable inkjet inks and fluids that adhere well to multiple substrates and exhibit no or only minor photoyellowing while maintaining good curing speed.

SUMMARY OF THE INVENTION

Preferred embodiments of the present invention provide radiation curable inkjet fluids and inks exhibiting good adhesion on a plurality of substrates and minor photoyellowing.

These and other preferred embodiments of the invention will become apparent from the description hereinafter.

Good photoyellowing and adhesion properties were surprisingly found by using a photoinitiator including a tertiary amine group in combination with a radiation curable composition containing a vinylether acrylate and a polyfunctional acrylate. Curing speed and other properties relevant to inkjet printing were upheld although isopropylthioxanthone or derivatives as photoinitiator were absent or at least substantially reduced in concentration.

Preferred embodiments of the present invention are realized with a radiation curable inkjet fluid as defined below.

Other preferred embodiments of the present invention are also realized with an inkjet printing method as defined below.

Further advantages and preferred embodiments of the present invention will become apparent from the following description.

DETAILED DESCRIPTION OF THE PREFERRED EMBODIMENTS

Definitions

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as a colorant that is practically insoluble in the application medium under the pertaining ambient conditions, hence having a solubility of less than 10 mg/L therein.

The term "C.I." is used in disclosing the present application as an abbreviation for Colour Index.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

The term "actinic radiation" as used in disclosing the present invention, means electromagnetic radiation capable of initiating photochemical reactions.

The term "ultraviolet radiation" as used in disclosing the present invention, means electromagnetic radiation in the wavelength range of about 100 to about 400 nanometers.

Radiation Curable Inkjet Fluids and Inks

A radiation curable fluid according to a preferred embodiment of the present invention contains a radiation curable composition including at least 25 wt %, preferably at least 30 wt % of a vinylether acrylate and at least 15 wt %, preferably at least 20 wt % of a polymerizable compound including at least three acrylate groups; and a photoinitiating system containing 0 to 3 wt % of isopropylthioxanthone or derivatives thereof and a photoinitiator including a tertiary amine group.

While inkjet fluids are substantially colourless, inkjet inks are capable of producing coloured images. Therefore, radiation curable inkjet inks according to preferred embodiments of the present invention include at least one colorant, which can be a dye or a pigment or a combination thereof. Preferably the colorant is a pigment, more preferably a dispersed pigment. The dispersant is preferably a polymeric dispersant.

In a preferred embodiment, the radiation curable inkjet fluids and inks are UV-curable inkjet fluids and inks.

Inkjet printing can be done with a single radiation curable fluid or ink according to a preferred embodiment of the present invention. However, preferably a combination of one or more radiation curable fluids or inks is used.

In a preferred embodiment, the radiation curable fluid is used as a primer on a substrate. The radiation curable fluid may also be used as a topcoat fluid, for example, for improving the glossiness of a printed image. The primer or topcoat fluid may be applied to the substrate by inkjet printing, but can also be applied by printing techniques, such as offset printing, flexographic printing, gravure and screen printing, by spraying techniques or by other coating techniques, such as dip coating, knife coating, extrusion coating, spin coating, slide hopper coating and curtain coating. When used as a primer, especially the improved adhesion properties are beneficial, while usage as a topcoat fluid mainly benefices from the reduced photoyellowing.

A radiation curable inkjet ink according to a preferred embodiment of the present invention is preferably used in a radiation curable inkjet ink set. The radiation curable inkjet ink set according to a preferred embodiment of the present invention includes at least one yellow curable inkjet ink (Y), at least one cyan curable inkjet ink (C) and at least one magenta curable inkjet ink (M) and preferably also at least one black curable inkjet ink (K). The curable CMYK inkjet ink set may also be extended with extra inks such as red, green, blue, and/or orange to further enlarge the colour gamut of the image. The CMYK ink set may also be extended by the combination of full density and light density inks of both colour inks and/or black inks to improve the image quality by lowered graininess and improved tonal reproduction.

Besides the vinylether acrylate and the polymerizable compound including at least three acrylate groups, the radiation curable inkjet fluids and inks may include other monomers, oligomers and/or prepolymers possessing different degrees of functionality. A mixture including combinations of mono-, di-, tri- and/or higher functionality monomers, oligomers or prepolymers may be used.

Other photoinitiators may be included in the radiation curable pigment inkjet ink. The photoinitiator suitable for use in the curable pigment dispersion include a Norrish type I initiator and a Norrish type II initiator.

The viscosity of the radiation curable inkjet fluids and inks is preferably less than 30 mPa·s, more preferably less than 15 mPa·s, and most preferably between 2 and 10 mPa·s at a shear rate of 100 s$^{-1}$ and a jetting temperature between 25 and 70° C.

The radiation curable inkjet fluids and inks may further also contain at least one surfactant.

The radiation curable inkjet fluids and inks preferably do not contain an evaporable component, but sometimes, it can be advantageous to incorporate a small amount of an organic solvent in such fluids and inks to improve adhesion to the surface of the ink-receiver after UV-curing. In this case, the added solvent can be any amount in the range that does not cause problems of solvent resistance and VOC, and preferably 0.1-10.0 wt %, and particularly preferably 0.1-5.0 wt %, each based on the total weight of the radiation curable inkjet fluid or ink.

The radiation curable inkjet inks may contain a dispersion synergist for further improving the dispersion stability of a pigmented inkjet ink.

The radiation curable inkjet fluids and inks may further also contain at least one polymerization inhibitor.

The radiation curable inkjet fluids and inks may further also contain at least one surfactant.

Vinylether Acrylates

The vinylether acrylate is a radiation curable monomer represented by Formula (I):

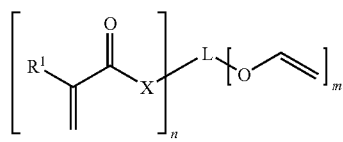

Formula (I)

wherein,

R$^1$ represents hydrogen, or a substituted or unsubstituted alkyl group,

L represents a linking group including at least one carbon atom,

X represents O, S or NR$^2$ wherein R$^2$ has the same meaning as R$^1$;

when X=NR$^2$, L and R$^2$ may form together a ring system, and n and m independently represent a value from 1 to 5.

In a preferred embodiment, the compound according to Formula (I) has R$^1$ representing hydrogen, X representing O, and n representing a value of 1. The value of m is preferably 1, 2 or 3. L preferably includes 2, 3 or 4 carbon atoms.

Preferred vinylether acrylates are those disclosed in U.S. Pat. No. 6,310,115 (AGFA), incorporated herein by reference. Particularly preferred compounds are 2-(2-vinyloxy-ethoxy)ethyl (meth)acrylate, most preferably the compound is 2-(2-vinyloxyethoxy)ethyl acrylate.

Other suitable vinylether (meth)acrylates are those disclosed in columns 3 and 4 of U.S. Pat. No. 6,767,9890 B (NIPPON SHOKUBAI), incorporated herein by specific reference.

The vinylether acrylates can be prepared according to standard synthetic methods known to those skilled in the art of organic synthesis. Suitable synthetic methods are disclosed in U.S. Pat. No. 6,310,115 (AGFA) and U.S. Pat. No. 6,767,9890 B (NIPPON SHOKUBAI).

A single compound or a mixture of vinylether acrylates may be used.

In a radiation curable inkjet ink or fluid according to a preferred embodiment of the present invention, the vinylether acrylate is preferably present in an amount of at least 25 wt %, more preferably at least 30 wt % and most preferably at least 40 wt % based upon the total weight of the radiation curable composition used in the radiation curable inkjet ink or fluid.

Polymerizable Compound Including at Least Three Acrylate Groups

The polymerizable compound including at least three acrylate groups may contain three, four, five or six acrylate groups.

In one preferred embodiment, the polymerizable compound including at least three acrylate groups is a triacrylate.

Suitable trifunctional acrylates include trimethylolpropane triacrylate, EO modified trimethylolpropane triacrylate, tri(propylene glycol) triacrylate, caprolactone modified trimethylolpropane triacrylate, pentaerythritol triacrylate, propoxylated glycerine triacrylate and propoxylated trimethylolpropane triacrylate. Most preferably trimethylolpropane triacrylate is used as a triacrylate.

Suitable higher functional acrylates include di-trimethylolpropane tetraacrylate, ethoxylated pentaeryhtitol tetraacrylate, pentaerithritol tetraacrylate, pentaerythritolethoxy tetraacrylate, dipentaerythritol hexaacrylate, ditrimethylolpropane tetraacrylate, dipentaerythritol pentaacrylate and caprolactam modified dipentaerythritol hexaacrylate.

A single polymerizable compound including at least three acrylate groups or a mixture thereof may be used.

In a radiation curable inkjet fluid or ink according to a preferred embodiment of the present invention, the polymerizable compound including at least three acrylate groups is preferably present in an amount of at least 15 wt %, more preferably at least 20 wt % and most preferably at least 30 wt % based upon the total weight of the radiation curable composition used in the radiation curable inkjet fluid or ink.

The weight ratio between the one or more vinylether acrylates and the one or more polymerizable compounds including at least three acrylate groups is preferably 3 to 2 or more. A weight ratio between the one or more vinylether acrylates and the one or more polymerizable compounds including at least three acrylate groups of 1 to 1 or less results often in more brittle cured layers.

Other Monomers and Oligomers

Any polymerizable compound commonly known in the art capable of free radical polymerization may be employed in the radiation curable inkjet fluid or ink according to a preferred embodiment of the present invention. A combination of monomers and/or oligomers may also be used. The monomers, oligomers and/or prepolymers may possess different degrees of functionality, and a mixture including combinations of monofunctional and difunctional monomers and/or oligomers may be used. The viscosity of the inkjet fluid or ink can be adjusted by varying the ratio between the monomers and oligomers.

Suitable polymerizable compounds include monofunctional and difunctional acrylate monomers and oligomers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate, cyclohexanone dimethanol diacrylate, and polytetramethylene glycol diacrylate.

Suitable polymerizable compounds include N-vinylamides such as, N-vinylcaprolactam or N-vinylformamide; and acrylamides or a substituted acrylamides, such as acryloylmorpholine.

Other suitable monofunctional acrylates include caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate and tridecyl acrylate.

Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Furthermore, methacrylates corresponding to the above-mentioned acrylates may be used with these acrylates. Of the methacrylates, methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and higher adhesion to an ink-receiver surface.

Examples of suitable polymerizable oligomers include epoxy acrylates, aliphatic urethane acrylates, aromatic urethane acrylates, polyester acrylates, and straight-chained acrylic oligomers.

Photoinitiators

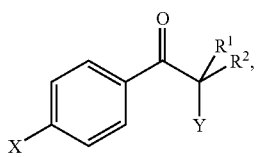

Formula (II)

wherein:

X is selected from the group consisting of a hydrogen, an alkyl group, an alkenyl group, an alkynyl group, an aralkyl group, an alkaryl group, an aryl group, an heteroaryl group, $OR^5$, $SR^6$ and $NR^7R^8$;

Y is selected from the group consisting of a hydroxyl and $NR^3R^4$;

with the proviso that at least one of X and Y includes a tertiary amine group;

$R^1$, $R^2$, $R^3$ and $R^4$ are independently selected from the group consisting of an alkyl group, an alkenyl group, an alkynyl group, an aralkyl group, an alkaryl group, an aryl group and an heteroaryl group;

$R^5$, $R^6$, $R^7$ and $R^8$ are independently selected from the group consisting of a hydrogen, an alkyl group, an alkenyl group, an alkynyl group, an aralkyl group, an alkaryl group, an aryl group and an heteroaryl group;

$R^1$ and $R^2$, $R^3$ and $R^4$ and $R^7$ and $R^8$ may represent the necessary atoms to form an optionally substituted five to eight membered ring; and each of the alkyl groups, the alkenyl groups, the alkynyl groups, the aralkyl groups, the alkaryl groups, the aryl groups and the heteroaryl groups for X, Y, $R^1$, $R^2$, $R^3$, $R^4$, $R^5$, $R^6$, $R^7$ and $R^8$ may independently be a substituted or unsubstituted group.

In a preferred embodiment of the photoinitiator according to Formula (II), $R^1$ and $R^2$, $R^3$ and $R^4$ and $R^7$ and $R^8$ may represent the necessary atoms to form an optionally substituted six membered ring.

In a more preferred embodiment of the photoinitiator according to Formula (II), $R^1$, $R^2$, $R^3$ and $R^4$ are independently selected from the group consisting of analkyl group, analkenyl group, analkynyl group, anaralkyl group and analkaryl group.

In a very preferred embodiment of the photoinitiator according to Formula (II), $R^1$ and $R^2$ both represent a methyl group.

In a very preferred embodiment of the photoinitiator according to Formula (II), $R^1$ and $R^2$ both represent a methyl group, Y represents a hydroxyl group and X represents an $OR^5$ group wherein $R^5$ is as defined above.

Typical examples of photoinitiators including a tertiary amine group are given by the list below, without being limited thereto.

INI-1

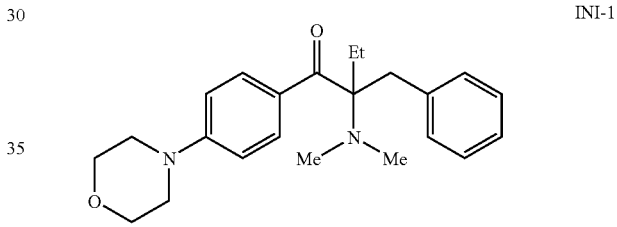

INI-2

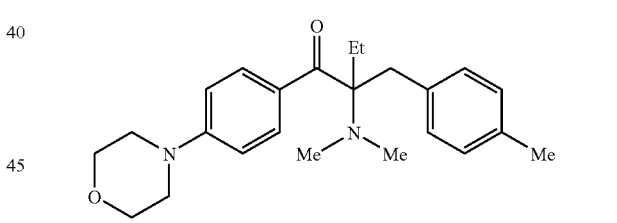

INI-3

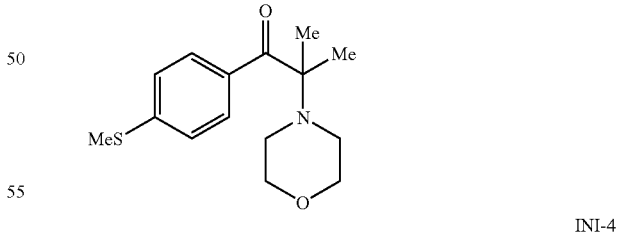

INI-4

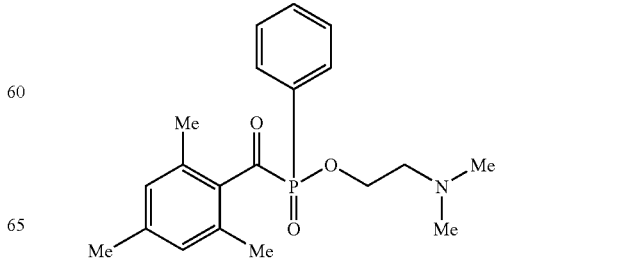

INI-5
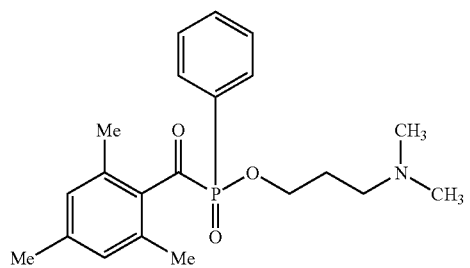
INI-6
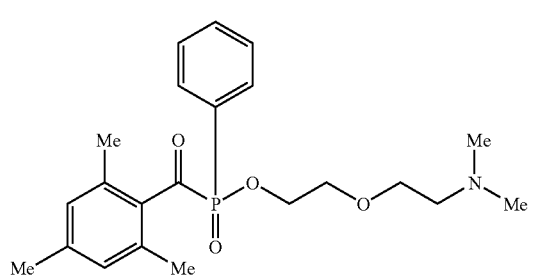
INI-7
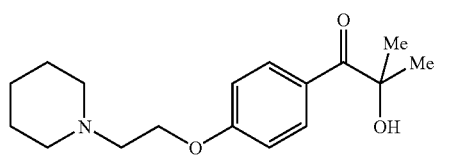
INI-8
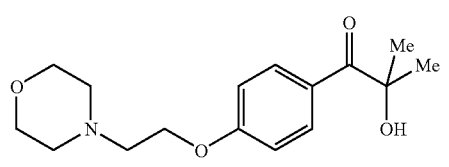
INI-9
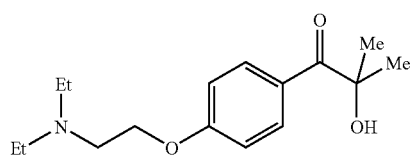
INI-10
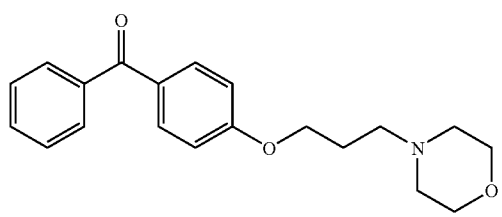
INI-11
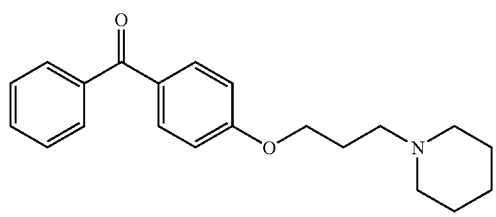
INI-12
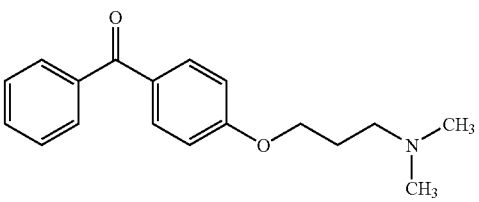
INI-13
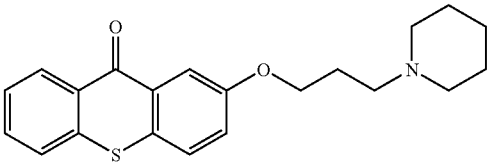
INI-14
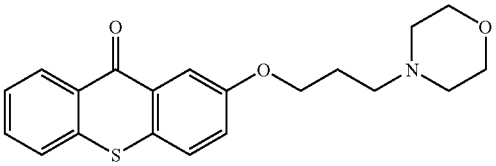
INI-15
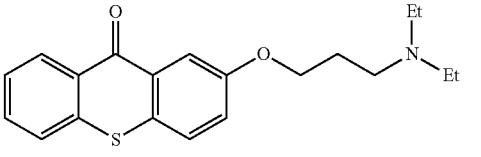
INI-17
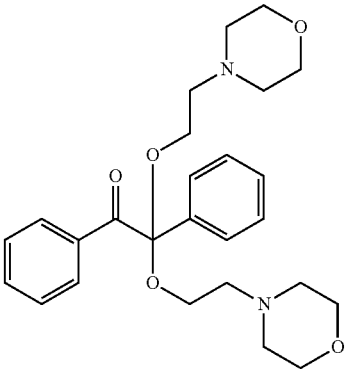
INI-17
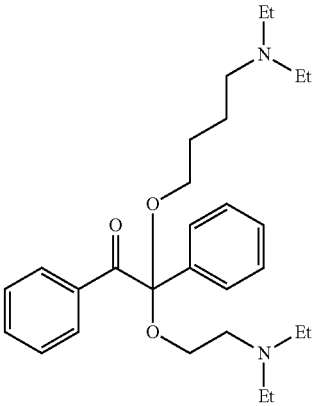

-continued

INI-18

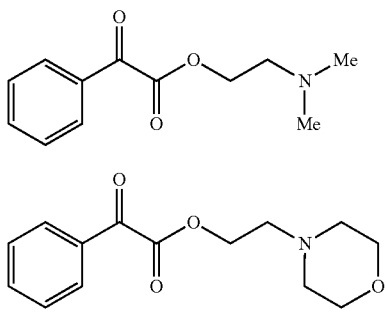

INI-19

The initiators INI-1, INI-2 and INI-3 are commercially available from Ciba Specialty Chemicals as IRGACURE™ 369, IRGACURE™ 379 and IRGACURE™ 907 respectively.

The aminophosphine oxide initiators INI-4 to INI-6 can be prepared as disclosed in example 12 of DE 10206096 (BASF A.-G.).

The initiators INI-7 and INI-8 can be prepared in a similar way as exemplified by the synthesis of 2-methyl-(4-(2-morfolino-ethoxy)phenyl)-2-hydroxy-propan-1-one (INI-8):

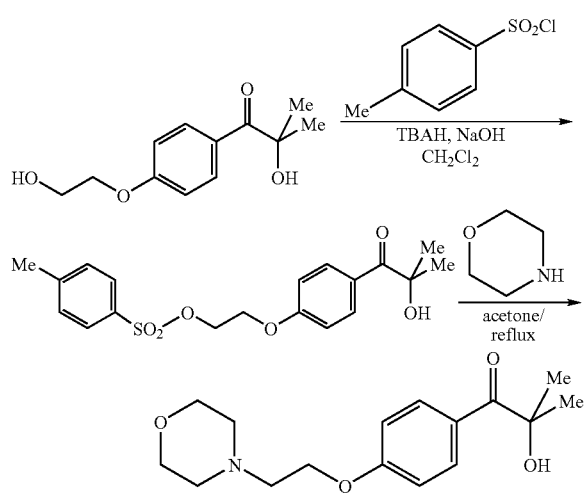

wherein TBAH represents tetrabutyl ammonium hydrogen sulphate.

The tosylate was prepared according to Knaus S. and Gruber H. F., Journal of Polymer Science Part A: Polymer Chemistry, 33, 929-939 (1995). 3.78 g (10 mmol) of the intermediate tosylate was dissolved in 50 ml acetone. 3.48 g (40 mmol) morpholine was added and the mixture was refluxed for 20 hours. The solvent was removed under reduced pressure and the residue was treated with 120 mL isopropyl acetate. The mixture was cooled to 0° C. and the salts were removed by filtration. The isopropyl acetate was removed under reduced pressure and the crude 2-methyl-(4-(2-morfolino-ethoxy)phenyl)-2-hydroxy-propan-1-one was purified by preparative column chromatography on a SVP D40 Merck column, using a gradient elution from CH2Cl2 to ethyl acetate, followed by a second gradient elution to ethyl acetate/methanol 95/5. The isolated 2-methyl-(4-(2-morfolino-ethoxy)phenyl)-2-hydroxy-propan-1-one was redissolved in a small amount CH2Cl2 and crystallized by the addition of n.-hexane. 1.2 g (41%) 2-methyl-(4-(2-morfolino-ethoxy)phenyl)-2-hydroxy-propan-1-one (INI-8) was isolated.

The initiators INI-10, INI-11, and INI-123 can be prepared by the synthesis of amino-benzophenones disclosed by Allen et al., Journal of Photochemistry and Photobiology, A: Chemistry, 54, 367-388 (1990).

The synthesis of the amino-thioxanthones INI-13, INI-14 and INI-15 has been disclosed by Peinado et al., Eur. Polym. Journal, 28(10), 1315-1320 (1992).

The synthesis of the amino-modified benzil ketals INI-16 and INI-17 has been disclosed in example 1 and 3 of EP0002707 (Ciba Geigy A.-G.).

The synthesis of amino-phenyl glyoxalates INI-18 and INI-19 has been disclosed by Shenghui H. and Neckers D. C., Tetrahedron, 53(8), 2751-2766 (1997).

Specific examples of other photoinitiators may include, but are not limited to, the following compounds or combinations thereof: benzophenone and substituted benzophenones, 1-hydroxycyclohexyl phenyl ketone, thioxanthones such as isopropylthioxanthone, benzil dimethylketal, bis(2,6-dimethylbenzoyl)-2,4,4-trimethylpentylphosphine oxide, 2,4,6-trimethylbenzoyldiphenylphosphine oxide, 2,2-dimethoxy-1,2-diphenylethan-1-one or 5,7-diiodo-3-butoxy-6-fluorone, diphenyliodonium fluoride and triphenylsulfonium hexafluophosphate.

Suitable commercial photoinitiators include IRGACURE™ 184, IRGACURE™ 500, IRGACURE™ 907, IRGACURE™ 369, IRGACURE™ 379, IRGACURE™ 1700, IRGACURE™ 651, IRGACURE™ 819, IRGACURE™ 1000, IRGACURE™ 1300, IRGACURE™ 1870, DAROCUR™ 1173, DAROCUR™ 2959, DAROCUR™ 4265 and DAROCUR™ ITX available from CIBA SPECIALTY CHEMICALS, LUCERIN™ TPO available from BASF AG, ESACURE™ KT046, ESACURE™ KIP150, ESACURE™ KT37 and ESACURE™ EDB available from LAMBERTI, H-NU™ 470 and H-NU™ 470X available from SPECTRA GROUP Ltd.

A preferred amount of photoinitiator is 0.3-50 wt % of the total weight of the radiation curable inkjet fluid or ink, and more preferably 1-15 wt % of the total weight of the radiation curable inkjet fluid or ink.

Pigments

The radiation curable ink according to a preferred embodiment of the present invention contains a colorant. Colorants used in the curable inks may be dyes, pigments or a combination thereof. Organic and/or inorganic pigments may be used.

The colorant is preferably a pigment or a polymeric dye, most preferably a pigment.

The effects of the invention can be most readily observed with white inks, e.g. including a titanium dioxide pigment, and cyan inks, e.g. a β-copper phthalocyanine pigment.

The pigments may be black, white, cyan, magenta, yellow, red, orange, violet, blue, green, brown, mixtures thereof, and the like. This colour pigment may be chosen from those disclosed by HERBST, Willy, et al. Industrial Organic Pigments, Production, Properties, Applications. 3rd edition. Wiley-VCH, 2004. ISBN 3527305769.

Particular preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 175, 180, 181, 185, 194 and 213.

Particular preferred pigments are C.I. Pigment Red 17, 22, 23, 41, 48:1, 48:2, 49:1, 49:2, 52:1, 57:1, 81:1, 81:3, 88, 112, 122, 144, 146, 149, 169, 170, 175, 176, 184, 185, 188, 202, 206, 207, 210, 216, 221, 248, 251, 254, 255, 264, 266, 270 and 272.

Particular preferred pigments are C.I. Pigment Violet 1, 2, 19, 23, 32, 37 and 39.

Particular preferred pigments are C.I. Pigment Blue 15:1, 15:2, 15:3, 15:4, 15:6, 16, 56, 61 and (bridged) aluminium phthalocyanine pigments.

Particular preferred pigments are C.I. Pigment Orange 5, 13, 16, 34, 40, 43, 59, 66, 67, 69, 71 and 73.

Particular preferred pigments are C.I. Pigment Green 7 and 36.

Particular preferred pigments are C.I. Pigment Brown 6 and 7.

Suitable pigments include mixed crystals of the above particular preferred pigments. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is CINQUASIA™ Magenta RT-355-D from Ciba Specialty Chemicals.

Carbon black is preferred as a black pigment. Suitable black pigments include carbon blacks such as Pigment Black 7 (e.g. Carbon Black MA8® from MITSUBISHI CHEMICAL), REGAL® 400R, MOGUL® L, ELFTEX® 320 from CABOT Co., or Carbon Black FW18, Special Black 250, Special Black 350, Special Black 550, PRINTEX® 25, PRINTEX® 35, PRINTEX® 55, PRINTEX® 90, PRINTEX® 150T from DEGUSSA. Additional examples of suitable pigments are disclosed in U.S. Pat. No. 5,389,133 (XEROX).

It is also possible to make mixtures of pigments. For example, in some inkjet ink applications a neutral black inkjet ink is preferred and can be obtained e.g. by mixing a black pigment and a cyan pigment into the ink. Also pigments may be combined to enlarge the colour gamut of an ink set. The inkjet application may also require one or more spot colours. Silver and gold are often desired colours for making a product more attractive by giving it an exclusive appearance.

Also non-organic pigments may be present in the inks. Suitable pigments are C.I. Pigment Metal 1, 2 and 3. Illustrative examples of the inorganic pigments include titanium oxide, barium sulfate, calcium carbonate, zinc oxide, lead sulfate, yellow lead, zinc yellow, red iron oxide (III), cadmium red, ultramarine blue, prussian blue, chromium oxide green, cobalt green, amber, titanium black and synthetic iron black. However, care should be taken to prevent migration and extraction of heavy metals in food application. In the preferred embodiment no pigments are used which contain a heavy metal selected from the group consisting of arsenic, lead, mercury and cadmium.

Pigment particles in inkjet ink should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. An average particle size smaller than 0.050 µm is less desirable for decreased light-fastness, but mainly also because very small pigment particles or individual pigment molecules thereof may still be extracted in food packaging applications.

The numeric average pigment particle size of pigment particles is best determined with a Brookhaven Instruments Particle Sizer BI90plus based upon the principle of dynamic light scattering. The ink is then diluted, for example, with ethyl acetate to a pigment concentration of 0.002 wt %. The measurement settings of the BI90plus are: 5 runs at 23° C., angle of 90°, wavelength of 635 nm and graphics=correction function.

In the case of a white curable ink, preferably a pigment with a refractive index greater than 1.60, preferably greater than 2.00, more preferably greater than 2.50 and most preferably greater than 2.60. The white pigments may be employed singly or in combination.

Preferably titanium dioxide is used for the pigment with a refractive index greater than 1.60. Titanium oxide occurs in the crystalline forms of anatase type, rutile type and brookite type. The anatase type has a relatively low density and is easily ground into fine particles, while the rutile type has a relatively high refractive index, exhibiting a high covering power. Either one of these is usable in this invention. It is preferred to make the most possible use of characteristics and to make selections according to the use thereof. The use of the anatase type having a low density and a small particle size can achieve superior dispersion stability, ink storage stability and ejectability. At least two different crystalline forms may be used in combination. The combined use of the anatase type and the rutile type which exhibits a high coloring power can reduce the total amount of titanium oxide, leading to improved storage stability and ejection performance of ink.

For surface treatment of the titanium oxide, an aqueous treatment or a gas phase treatment is applied, and an alumina-silica treating agent is usually employed. Untreated-, alumina treated- or alumina-silica treated-titanium oxide are employable.

The numeric average particle diameter of the titanium oxide or other white pigments is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a MALVERN™ nano-S available from Goffin-Meyvis. A sample can be, for example, be prepared by addition of one drop of ink to a cuvet containing 1.5 mL ethyl acetate and mixed until a homogenous sample was obtained. The measured particle size is the average value of 3 consecutive measurements consisting of 6 runs of 20 seconds.

Generally pigments are stabilized in the dispersion medium by dispersing agents, such as polymeric dispersants or surfactants. However, the surface of the pigments can be modified to obtain so-called "self-dispersible" or "self-dispersing" pigments, i.e. pigments that are dispersible in the dispersion medium without dispersants.

The pigment is preferably used in a pigment dispersion used for preparing inkjet inks in an amount of 10 to 40 wt %, more preferably of 15 to 30 wt % based on the total weight of the pigment dispersion. In a curable inkjet ink the pigment is preferably present in an amount of 0.1 to 20 wt %, preferably 1 to 10 wt % based on the total weight of the inkjet ink.

Dispersants

The dispersant is preferably a polymeric dispersant. Typical polymeric dispersants are copolymers of two monomers but may contain three, four, five or even more monomers. The properties of polymeric dispersants depend on both the nature of the monomers and their distribution in the polymer. Suitable copolymeric dispersants have the following polymer compositions:
- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Polymeric dispersants may have different polymer architecture including linear, comb/branched, star, dendritic (including dendrimers and hyperbranched polymers). A general review on the architecture of polymers is given by ODIAN, George, Principles of Polymerization, 4th edition, Wiley-Interscience, 2004, p. 1-18.

Comb/branched polymers have side branches of linked monomer molecules protruding from various central branch points along the main polymer chain (at least 3 branch points).

Star polymers are branched polymers in which three or more either similar or different linear homopolymers or copolymers are linked together to a single core.

Dendritic polymers include the classes of dendrimers and hyperbranched polymers. In dendrimers, with well-defined mono-disperse structures, all branch points are used (multi-step synthesis), while hyperbranched polymers have a plurality of branch points and multifunctional branches that lead to further branching with polymer growth (one-step polymerization process).

Suitable polymeric dispersants may be prepared via addition or condensation type polymerizations. Polymerization methods include those described by ODIAN, George, Principles of Polymerization, 4th edition, Wiley-Interscience, 2004, p. 39-606.

Addition polymerization methods include free radical polymerization (FRP) and controlled polymerization techniques. Suitable controlled radical polymerization methods include:
- RAFT: reversible addition-fragmentation chain transfer;
- ATRP: atom transfer radical polymerization
- MADIX: reversible addition-fragmentation chain transfer process, using a transfer active xanthate;
- Catalytic chain transfer (e.g. using cobalt complexes);
- Nitroxide (e.g. TEMPO) mediated polymerizations;
- Other suitable controlled polymerization methods include:
- GTP: group transfer polymerization;
- Living cationic (ring-opening) polymerizations;
- Anionic co-ordination insertion ring-opening polymerization; and
- Living anionic (ring-opening) polymerization.

Reversible addition-fragmentation transfer (RAFT): controlled polymerization occurs via rapid chain transfer between growing polymer radicals and dormant polymer chains. A review article on RAFT synthesis of dispersants with different polymeric geometry is given in QUINN J. F. et al., Facile Synthesis of comb, star, and graft polymers via reversible addition-fragmentation chain transfer (RAFT) polymerization, Journal of Polymer Science, Part A: Polymer Chemistry, Vol. 40, 2956-2966, 2002.

Group transfer polymerization (GTP): the method of GTP used for synthesis of AB block copolymers is disclosed by SPINELLI, Harry J, GTP and its use in water based pigment dispersants and emulsion stabilisers, Proc. of 20th Int. Conf. Org. Coat. Sci. Technol., New Platz, N.Y., State Univ. N.Y., Inst. Mater. Sci. p. 511-518.

The synthesis of dendritic polymers is described in the literature. The synthesis of dendrimers in NEWCOME, G. R., et al. Dendritic Molecules: Concepts, Synthesis, Perspectives. VCH: WEINHEIM, 2001. Hyperbranching polymerization is described by BURCHARD, W. Solution properties of branched macromolecules. *Advances in Polymer Science.* 1999, vol. 143, no. II, p. 113-194. Hyperbranched materials can be obtained by polyfunctional polycondensation as disclosed by FLORY, P. J. Molecular size distribution in three-dimensional polymers. VI. Branched polymer containing A-R-Bf-1-type units. *Journal of the American Chemical Society.* 1952, vol. 74, p. 2718-1723.

Living cationic polymerizations is e.g. used for the synthesis of polyvinyl ethers as disclosed in WO 2005/012444 (CANON), US 20050197424 (CANON) and US 20050176846 (CANON). Anionic co-ordination ring-opening polymerization is e.g. used for the synthesis of polyesters based on lactones. Living anionic ring-opening polymerization is e.g. used for the synthesis of polyethylene oxide macromonomers.

Free radical Polymerization (FRP) proceeds via a chain mechanism, which basically consists of four different types of reactions involving free radicals: (1) radical generation from non-radical species (initiation), (2) radical addition to a substituted alkene (propagation), (3) atom transfer and atom abstraction reactions (chain transfer and termination by disproportionation), and (4) radical-radical recombination reactions (termination by combination).

Polymeric dispersants having several of the above polymer compositions are disclosed in U.S. Pat. No. 6,022,908 (HP), U.S. Pat. No. 5,302,197 (DU PONT) and U.S. Pat. No. 6,528,557 (XEROX).

Suitable statistical copolymeric dispersants are disclosed in U.S. Pat. No. 5,648,405 (DU PONT), U.S. Pat. No. 6,245,832 (FUJI XEROX), U.S. Pat. No. 6,262,207 (3M), US 20050004262 (KAO) and U.S. Pat. No. 6,852,777 (KAO).

Suitable alternating copolymeric dispersants are described in US 20030017271 (AKZO NOBEL).

Suitable block copolymeric dispersants have been described in numerous patents, especially block copolymeric dispersants containing hydrophobic and hydrophilic blocks. For example, U.S. Pat. No. 5,859,113 (DU PONT) discloses AB block copolymers, U.S. Pat. No. 6,413,306 (DU PONT) discloses ABC block copolymers.

Suitable graft copolymeric dispersants are described in CA 2157361 (DU PONT) (hydrophobic polymeric backbone and hydrophilic side chains); other graft copolymeric dispersants are disclosed in U.S. Pat. No. 6,652,634 (LEXMARK), U.S. Pat. No. 6,521,715 (DU PONT).

Suitable branched copolymeric dispersants are described U.S. Pat. No. 6,005,023 (DU PONT), U.S. Pat. No. 6,031,019 (KAO), U.S. Pat. No. 6,127,453 (KODAK).

Suitable dendritic copolymeric dispersants are described in e.g. U.S. Pat. No. 6,518,370 (3M), U.S. Pat. No. 6,258,896 (3M), U.S. Pat. No. 2004102541 (LEXMARK), U.S. Pat. No.

6,649,138 (QUANTUM DOT), US 2002256230 (BASF), EP 1351759 A (EFKA ADDITIVES) and EP 1295919 A (KODAK).

Suitable designs of polymeric dispersants for inkjet inks are disclosed in SPINELLI, Harry J., Polymeric Dispersants in Inkjet technology, *Advanced Materials*, 1998, Vol. 10, no. 15, p. 1215-1218.

The monomers and/or oligomers used to prepare the polymeric dispersant can be any monomer and/or oligomer found in the Polymer Handbook Vol. 1+2, 4th edition, edited by J. BRANDRUP et al., Wiley-Interscience, 1999.

Polymers useful as pigment dispersants include naturally occurring polymers, and specific examples thereof include: proteins, such as glue, gelatine, casein, and albumin; naturally occurring rubbers, such as gum arabic and tragacanth; glucosides such as saponin; alginic acid and alginic acid derivatives, such as propylene glycol alginate; and cellulose derivatives, such as methyl cellulose, carboxymethyl cellulose and ethylhydroxy cellulose; wool and silk, and synthetic polymers.

Suitable examples of monomers for synthesizing polymeric dispersants include: acrylic acid, methacrylic acid, maleic acid (or there salts), maleic anhydride, alkyl(meth) acrylates (linear, branched and cycloalkyl) such as methyl (meth)acrylate, n-butyl(meth)acrylate, tert-butyl(meth)acrylate, cyclohexyl(meth)acrylate, and 2-ethylhexyl(meth) acrylate; aryl(meth)acrylates such as benzyl(meth)acrylate, and phenyl(meth)acrylate; hydroxyalkyl(meth)acrylates such as hydroxyethyl(meth)acrylate, and hydroxypropyl (meth)acrylate; (meth)acrylates with other types of functionalities (e.g. oxiranes, amino, fluoro, polyethylene oxide, phosphate substituted) such as glycidyl (meth)acrylate, dimethylaminoethyl(meth)acrylate, trifluoroethyl acrylate, methoxypolyethyleneglycol (meth)acrylate, and tripropyleneglycol (meth)acrylate phosphate; allyl derivatives such as allyl glycidyl ether; styrenics such as styrene, 4-methylstyrene, 4-hydroxystyrene, 4-acetostyrene, and styrene sulfonic acid; (meth)acrylonitrile; (meth)acrylamides (including N-mono and N,N-disubstituted) such as N-benzyl (meth) acrylamide; maleimides such as N-phenyl maleimide; vinyl derivatives such as vinylcaprolactam, vinylpyrrolidone, vinylimidazole, vinylnapthalene, and vinyl halides; vinylethers such as vinylmethyl ether; vinylesters of carboxylic acids such as vinylacetate, vinylbutyrate, and vinyl benzoate.

Suitable condensation type polymers include polyurethanes, polyamides, polycarbonates, polyethers, polyureas, polyimines, polyimides, polyketones, polyesters, polysiloxanes, phenol-formaldehydes, urea-formaldehydes, melamine-formaldehydes, polysulfides, polyacetals or combinations thereof.

Suitable copolymeric dispersants are acrylic acid/acrylonitrile copolymers, vinyl acetate/acrylic ester copolymers, acrylic acid/acrylic ester copolymers, styrene/acrylic acid copolymers, styrene/methacrylic acid copolymers, styrene/ methacrylic acid/acrylic ester copolymers, styrene/α-methylstyrene/acrylic acid copolymers, styrene/α-methylstyrene/ acrylic acid/acrylic ester copolymers, styrene/maleic acid copolymers, styrene/maleic anhydride copolymers, vinylnaphthalene/acrylic acid copolymers, vinylnapthalene/maleic acid copolymers, vinyl acetate/ethylene copolymers, vinyl acetate/fatty acid/ethylene copolymers, vinyl acetate/ maleic ester copolymers, vinyl acetate/crotonic acid copolymers and vinyl acetate/acrylic acid copolymers.

Suitable chemistries of copolymeric dispersants also include:
Copolymers which are the product of a condensation process of poly(ethylene imine) with a carboxylic acid terminated polyester (made by addition polymerization); and
Copolymers which are the product of a reaction of a multifunctional isocyanate with:
a compound monosubstituted with a group that is capable of reacting with an isocyanate, e.g. polyester;
a compound containing two groups capable of reacting with an isocyanate (cross-linker); and/or
a compound with at least one basic ring nitrogen and a group that is capable of reacting with an isocyanate group.

A detailed list of suitable polymeric dispersants is disclosed by MC CUTCHEON, Functional Materials, North American Edition, Glen Rock, N.J.: Manufacturing Confectioner Publishing Co., 1990, p. 110-129.

Suitable pigment stabilisers are also disclosed in DE 19636382 (BAYER), U.S. Pat. No. 5,720,802 (XEROX), U.S. Pat. No. 5,713,993 (DU PONT), WO 96/12772 (XAAR) and U.S. Pat. No. 5,085,689 (BASF).

One polymeric dispersant or a mixture of two or more polymeric dispersants may be present to improve the dispersion stability further. Sometimes surfactants can also be used as pigment dispersants, thus a combination of a polymeric dispersant with a surfactant is also possible.

The polymeric dispersant can be non-ionic, anionic or cationic in nature; salts of the ionic dispersants can also be used.

The polymeric dispersant has preferably a polymerization degree DP between 5 and 1,000, more preferably between 10 and 500 and most preferably between 10 and 100.

The polymeric dispersant has preferably a number average molecular weight Mn between 500 and 30,000, more preferably between 1,500 and 10,000.

The polymeric dispersant has preferably a weight average molecular weight Mw smaller than 100,000, more preferably smaller than 50,000 and most preferably smaller than 30,000.

The polymeric dispersant has preferably a polymeric dispersity PD smaller than 2, more preferably smaller than 1.75 and most preferably smaller than 1.5.

Commercial examples of polymeric dispersants are the following:
DISPERBYK™ dispersants available from BYK CHEMIE GMBH;
SOLSPERSE™ dispersants available from NOVEON;
TEGO™ DISPERS™ dispersants from DEGUSSA;
EDAPLAN™ dispersants from MÜNZING CHEMIE;
ETHACRYL™ dispersants from LYONDELL;
GANEX™ dispersants from ISP;
DISPEX™ and EFKA™ dispersants from CIBA SPECIALTY CHEMICALS INC;
DISPONER™ dispersants from DEUCHEM; and
JONCRYL™ dispersants from JOHNSON POLYMER.

Particularly preferred polymeric dispersants include SOLSPERSE™ dispersants from NOVEON, EFKA™ dispersants from CIBA SPECIALTY CHEMICALS INC and DISPERBYK™ dispersants from BYK CHEMIE GMBH.

Particularly preferred dispersants for UV-curable pigmented dispersions are SOLSPERSE™ 32000, 35000 and 39000 dispersants from NOVEON.

The polymeric dispersant is preferably used in an amount of 2 to 600 wt %, more preferably 5 to 200 wt % based on the weight of the pigment.

Dispersion Synergists

A dispersion synergist may be added for improving the dispersion quality and stability of pigment dispersions and inkjet inks. A mixture of dispersion synergists can be used to further improve dispersion stability.

The dispersion synergist usually consists of an anionic part and a cationic part. The anionic part of the dispersion synergist exhibiting a certain molecular similarity with the colour pigment and the cationic part of the dispersion synergist consists of one or more protons and/or cations to compensate the charge of the anionic part of the dispersion synergist.

The synergist is preferably added in a smaller amount than the polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 100:1, preferably between 2:1 and 20:1.

Suitable dispersion synergists that are commercially available include SOLSPERSE™ 5000 and SOLSPERSE™ 22000 from NOVEON.

Particular preferred pigments for the magenta ink used are a diketopyrrolo-pyrrole pigment or a quinacridone pigment. Suitable dispersion synergists include those disclosed in EP 1790698 A (AGFA GRAPHICS) and EP 1790695 A (AGFA GRAPHICS).

In dispersing C.I. Pigment Blue 15:3, the use of a sulfonated Cu-phthalocyanine dispersion synergist, e.g. SOLSPERSE™ 5000 from NOVEON is preferred. Suitable dispersion synergists for yellow inkjet inks include those disclosed in EP 1790697 A (AGFA GRAPHICS).

Inhibitors

Radiation curable inkjet fluids and inks according to a preferred embodiment of the present invention may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, SUMILIZER™ GA-80, SUMILIZER™ GM and SUMILIZER™ GS produced by Sumitomo Chemical Co. Ltd.; GENORAD™ 16, GENORAD™ 18 and GENORAD™ 20 from Rahn AG; IRGASTAB™ UV10 and IRGASTAB™ UV22, TINUVIN™ 460 and CGS20 from Ciba Specialty Chemicals; FLOORSTAB™ UV range (UV-1, UV-2, UV-5 and UV-8) from Kromachem Ltd, ADDITOL™ S range (S100, 5110, 5120 and 5130) from Cytec Surface Specialties.

Since excessive addition of these polymerization inhibitors will lower the fluid and ink sensitivity to curing, it is preferred that the amount capable of preventing polymerization is determined prior to blending. The amount of a polymerization inhibitor is preferably lower than 2 wt % of the total fluid or ink.

Surfactants

Surfactants are known for use in inkjet fluids and inks to reduce the surface tension of the fluid or ink in order to reduce the contact angle on the substrate, i.e. to improve the wetting of the substrate by the fluid or ink. On the other hand, the jettable fluid or ink must meet stringent performance criteria in order to be adequately jettable with high precision, reliability and during an extended period of time. To achieve both wetting of the substrate by the fluid or ink and high jetting performance, typically, the surface tension of the fluid or ink is reduced by the addition of one or more surfactants. In the case of curable inkjet inks, however, the surface tension of the inkjet ink is not only determined by the amount and type of surfactant, but also by the polymerizable compounds, the polymeric dispersants and other additives in the ink composition.

The surfactant(s) can be anionic, cationic, non-ionic, or zwitter-ionic and are usually added in a total quantity less than 20 wt % based on the total weight of the inkjet ink or fluid and particularly in a total less than 10 wt % based on the total weight of the inkjet ink or fluid.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants include fluoro surfactants (such as fluorinated hydrocarbons) and silicone surfactants. The silicones are typically siloxanes and can be alkoxylated, polyether modified, polyether modified hydroxy functional, amine modified, epoxy modified and other modifications or combinations thereof. Preferred siloxanes are polymeric, for example polydimethylsiloxanes.

The fluorinated or silicone compound used as a surfactant may be a cross-linkable surfactant. Suitable copolymerizable compounds having surface-active effects include, for example, polyacrylate copolymers, silicone modified acrylates, silicone modified methacrylates, acrylated siloxanes, polyether modified acrylic modified siloxanes, fluorinated acrylates, and fluorinated methacrylate. These acrylates can be mono-, di-, tri- or higher functional (meth)acrylates.

Depending upon the application a surfactant can be used with a high, low or intermediate dynamic surface tension. Silicone surfactants are generally known to have low dynamic surface tensions while fluorinated surfactants are known to have higher dynamic surface tensions.

Useful commercially available fluorinated surfactants are for example the ZONYL™ range of fluoro-surfactants from DUPONT and the FLUORAD™ range of fluoro-surfactants from 3M. Other fluorinated surfactants are e.g. described in EP 1412438 A (3M).

Silicone surfactants are often preferred in curable inkjet fluids and inks, especially the reactive silicone surfactants, which are able to be polymerized together with the polymerizable compounds during the curing step.

Useful commercially available silicone surfactants are often polysiloxane surfactants, especially polyether modified polysiloxanes, preferably with one or more acrylate function in order to become polymerizable.

Examples of useful commercial silicone surfactants are those supplied by BYK CHEMIE GMBH (including BYK™-302, 307, 310, 331, 333, 341, 345, 346, 347, 348, UV3500, UV3510 and UV3530), those supplied by TEGO CHEMIE SERVICE (including Tego RAD™ 2100, 2200N, 2250, 2300, 2500, 2600 and 2700), EBECRYL™ 1360 a polysilixone hexaacrylate from CYTEC INDUSTRIES BV and Efka™-3000 series (including EFKA™-3232 and EFKA™-3883) from EFKA CHEMICALS B.V.

Preparation of Inkjet Inks

The radiation curable pigment inkjet inks according to a preferred embodiment of the present invention may be prepared by milling the pigment in the dispersion medium, preferably in the presence of a polymeric dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics.

In a preferred embodiment, the grinding media can include particles, preferably substantially spherical in shape, e.g. beads consisting essentially of a polymeric resin or yttrium stabilized zirconium oxide beads.

In the process of mixing, milling and dispersion, each process is performed with cooling to prevent build up of heat, and as much as possible under light conditions in which actinic radiation has been substantially excluded.

The curable pigment inkjet ink may contain more than one pigment, the inkjet ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture include the mill grind and the milling media. The mill grind includes pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, the selected mechanical means and residence conditions, the initial and desired final particle size, etc. In the present invention pigment dispersions with an average particle size of less than 150 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make the inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

In preparing the inkjet ink, it is preferred that one or more degassing steps are performed at one time or another for removing air or gas bubbles from the ink. Degassing is preferably performed by heating and/or reduced pressure. The degassing step(s) can be performed on the concentrated pigment dispersion and/or on the final inkjet ink composition.

Printing Device

The radiation curable fluids and inks according to a preferred embodiment of the present invention may be jetted by one or more printing heads ejecting small droplets of ink in a controlled manner through nozzles onto an ink-receiver surface, which is moving relative to the printing head(s).

A preferred printing head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the printing head creating a void, which is then filled with fluid or ink. When the voltage is again removed, the ceramic expands to its original shape, ejecting a drop of fluid or ink from the print head. However the inkjet printing method according to the present invention is not restricted to piezoelectric inkjet printing. Other inkjet printing heads can be used and include various types, such as a continuous type and thermal, electrostatic and acoustic drop on demand type.

At high printing speeds, the fluids and inks must be ejected readily from the printing heads, which puts a number of constraints on the physical properties of the fluid or ink, e.g. a low viscosity at the jetting temperature, which may vary from 25° C. to 110° C., a surface energy such that the printing head nozzle can form the necessary small droplets, a homogenous ink capable of rapid conversion to a dry printed area, . . . .

The inkjet printing head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet printing heads or multiple staggered inkjet printing heads which cover the entire width of the ink-receiver surface. In a single pass printing process the inkjet printing heads usually remain stationary and the ink-receiver surface is transported under the inkjet printing heads.

Curing Device

The curable inkjet fluids and inks can be cured by exposing them to actinic radiation, by thermal curing and/or by electron beam curing. A preferred means of radiation curing is ultraviolet radiation. Preferably the curing is performed by an overall exposure to actinic radiation, by overall thermal curing and/or by overall electron beam curing.

The curing device may be arranged in combination with the print head of the inkjet printer, travelling therewith so that the curable liquid is exposed to curing radiation very shortly after been jetted.

In such an arrangement it can be difficult to provide a small enough radiation source connected to and travelling with the print head. Therefore, a static fixed radiation source may be employed, e.g. a source of curing UV-light, connected to the radiation source by means of flexible radiation conductor such as a fibre optic bundle or an internally reflective flexible tube.

Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source, as long as part of the emitted light can be absorbed by the photoinitiator or photoinitiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

Materials

All materials used in the following examples were readily available from standard sources such as Aldrich Chemical Co. (Belgium) and Acros (Belgium) unless otherwise specified.

PB15:4 is an abbreviation used for HOSTAPERM™ Blue P-BFS, a cyan pigment (C.I. Pigment Blue 15:4) available from CLARIANT.

DB162 is an abbreviation used for the polymeric dispersant DISPERBYK™ 162 available from BYK CHEMIE GMBH whereof the solvent mixture of 2-methoxy-1-methylethylacetate, xylene and n-butylacetate was removed.

S35000 is an abbreviation used for SOLSPERSE™ 35000, a polyethyleneimine-polyester hyperdispersant from NOVEON.

DPGDA is dipropyleneglycoldiacrylate from SARTOMER.

VEEA is 2-(vinylethoxy)ethyl acrylate, a difunctional monomer available from NIPPON SHOKUBAI, Japan.

TMPTA is trimethylolpropane triacrylate available as SARTOMER™ SR351 from SARTOMER.

VCL is N-vinyl caprolactam available from BASF BELGIUM, NV.

SR339 is 2-phenoxyethyl acrylate available as SARTOMER™ SR339C from SARTOMER.

GENORAD™ 16 is a polymerization inhibitor from RAHN AG.

GENOSOL is a 50 wt % solution of GENORAD™ 16 in DPGDA.

ITX is an abbreviation used for DAROCUR™ ITX, an isomeric mixture of 2- and 4-isopropylthioxanthone from CIBA SPECIALTY CHEMICALS.

TPO is an abbreviation used for 2,4,6-trimethylbenzoyl-diphenyl-phosphineoxide available under the trade name DAROCUR™ TPO from CIBA SPECIALTY CHEMICALS.

PBZ is an abbreviation used for 4-phenylbenzophenone, a photoinitiator available under the trade name GENOCURE™ PBZ is from RAHN AG.

EPD is ethyl 4-dimethylaminobenzoate, available under the trade name of GENOCURE™ EPD from RAHN AG.

IRGACURE™ 907 is 2-methyl-1-[4-(methylthio)phenyl]-2-morpholino-propan-1-one, a photoinitiator available from CIBA SPECIALTY CHEMICALS.

IRGACURE™ 369 is 2-benzyl-2-dimethylamino-1-(4-morpholinphenyl)-butan-1-one, a photoinitiator available from CIBA SPECIALTY.

IRGACURE™ 379 is a photoinitiator available from CIBA SPECIALTY having as chemical structure:

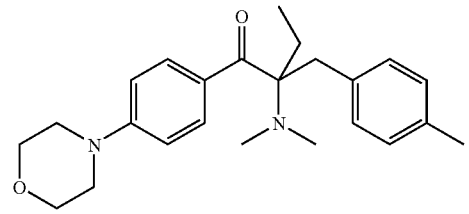

BYKSOL is 50 wt % solution of BYK™ UV3510 in DPGDA. BYK™ UV3510 is a polyethermodified polydimethylsiloxane wetting agent available from BYK CHEMIE GMBH.

TEGOSOL is a 50 wt % solution of TEGO™ Rad 2100 in DPGDA;

TEGO™ Rad 2100 is a surfactant available from TEGO CHEMIE SERVICES GMBH.

PET100 is a 100 μm unsubbed PET substrate with on the backside an antiblocking layer with antistatic properties available from AGFA-GEVAERT as P100C PLAIN/ABAS.

PP is a polypropylene substrate for which PRIPLAK™ Classic available from ANTALIS, Belgium and manufactured by PRIPLAK, France was used.

PVC is a polyvinylchloride substrate for which PENSTICK™ 5155 WH available from ANTALIS, Belgium and manufactured by MOLCO, Belgium was used.

PC is a polycarbonate substrate for which BARLO™ TL 30% available from ANTALIS, Belgium and manufactured by BARLO, Germany was used.

PMMA is polymethylmethacrylate substrate for which BARLO™ XT from ANTALIS, Belgium and manufactured by BARLO, Germany was used PS is a polystyrene substrate for which IROSTYRENE™ MAT from ANTALIS, Belgium and manufactured by IROPLASTICS, Austria was used.

ALU is an aluminum substrate for which DIBOND™ WHITE 2 mm available from ANTALIS, Belgium and manufactured by ALCAN SINGEN, Germany was used.

Measurement Methods

1. Average Particle Size

The average particle size of pigment particles in a non-aqueous inkjet ink was determined with a Brookhaven Instruments Particle Sizer BI90plus based upon the principle of dynamic light scattering. The ink or dispersion was diluted with ethyl acetate to a pigment concentration of 0.002 wt %. The measurement settings of the BI90plus were: 5 runs at 23° C., angle of 90°, wavelength of 635 nm and graphics=correction function.

For good ink jet characteristics (jetting characteristics and print quality) the average particle size of the dispersed particles should be less than 200 nm, preferably less than 150 nm.

2. Curing Speed

The percentage of the maximum output of the lamp was taken as a measure for curing speed, the lower the number the higher curing speed. A sample was considered as fully cured at the moment scratching with a Q-tip caused no visual damage.

3. Measurement of CieL*a*b* Parameters

Samples were measured with a spectrophotometer (Gretag SPM50) to determine the coordinates of the L*a*b* colours system of the colour difference indication method specified in CIE (Commission International de l'Eclairage). In this case, the measurement was carried out under conditions of light source D50, provision of no light source filter, absolute white as reference white, and angle of visibility 2°.

4. Adhesion

De adhesion is evaluated by a cross-cut test according to ISO2409:1992(E). Paints. *International standard*. 1992-08-15. using a Braive No. 1536 Cross Cut Tester from BRAIVE INSTRUMENTS with spacing of a 1 mm between cuts and using a weight of 600 g, in combination with a TESATAPE™ 4104 PVC tape.

The evaluation was made in accordance with the classification described below.

Classification:

0=The edges of the cuts are completely smooth: none of the squares of the lattice is detached (=perfect adhesion).
1=Detachment of small flakes of the coating at the intersections of the cuts. A cross-cut area not greater than 5% is affected.
2=The coating has flaked along the edges and/or at the intersections of the cuts. A cross-cut area greater than 5%, but not significantly greater than 15%, is affected.
3=The coating has flaked along the edges of the cuts partly or wholly in large ribbons, and/or it has flaked partly or wholly on different parts of the squares. A cross-cut area significantly greater than 15%, but not significantly greater than 35%, is affected.
4=The coating has flaked along the edges of the cuts in large ribbons, and/or some of the squares has detached partly or wholly. A cross-cut area significantly greater than 35%, but not significantly greater than 65%, is affected.
5=Any degree of flaking that cannot even be classified by classification 4

5. Photoyellowing

The photoyellowing effect of a sample is evaluated by calculation of Formula (A) using the CieL*a*b* parameters (noted with index "0") determined directly after curing and using the CieL*a*b* parameters (noted with index "1") determined after storing the sample shielded from UV light and visible light for 24 hours.

$$\Delta E_{ab} = \sqrt{(L_1 - L_0)^2 + (a_1^* - a_0^*)^2 + (b_1^* - b_0^*)^2} \quad \text{Formula (A)}$$

Radiation curable inkjet fluids and inks, exhibiting good properties for photoyellowing, have a value for $\Delta E_{ab}$ which is less than 1.5, preferably less that 1.0. No photoyellowing corresponds to a value for $\Delta E_{ab}$ equal to zero.

Example 1

This example illustrates the effect on photoyellowing and adhesion by using a photoinitiator including a tertiary amine group in combination with a radiation curable composition containing VEEA and TMPTA.

Preparation of the Pigment Dispersion CPD1

500 g of the polymeric dispersant DB162 and 33 g of the polymerization inhibitor GENORAD™ 16 were dissolved in 3870 g of DPGDA in a vessel of 6 L using a DISPERLUX™ disperser (from DISPERLUX S.A.R.L., Luxembourg). 1000 g of cyan pigment PB15:4 was added to the solution and stirred for 30 minutes. The vessel was then connected to a Bachofen DYNOMILL ECM Pilot mill having an internal volume of 1.5 L filled for 42% with 0.4 mm yttrium stabilized zirconia beads ("high wear resistant zirconia grinding media" from TOSOH Co.). The mixture was circulated over the mill for 2 hours and 18 minutes at a flow rate of about 2 L per minute and a rotation speed in the mill of about 13 m/s. 1667 g of a 30 wt % solution of DB162 in DPGDA was added to the pigment dispersion and circulated over the mill for another 20 minutes. During the complete milling procedure the content in the mill was cooled to a temperature of 42° C. After milling, the concentrated pigment dispersion CPD1 was discharged into another 6 L vessel. The resulting concentrated pigment dispersion CPD1 according to Table 1 exhibited an average particle size of 108 nm.

TABLE 1

| Component | wt % |
|---|---|
| PB15:4 | 15 |
| DB162 | 15 |
| GENORAD ™ 16 | 1 |
| DPGDA | 69 |

Preparation of Radiation Curable Inks

The comparative radiation curable inkjet inks COMP-1 to COMP-5 and the inventive radiation curable inkjet inks INV-1 to INV-5 were prepared by adding to the concentrated pigment dispersion CPD1 and mixing the components according to Table 2, respectively Table 3. The weight % (wt %) of the components were based on the total weight of the radiation curable inkjet ink.

TABLE 2

| wt % of component: | COMP-1 | COMP-2 | COMP-3 | COMP-4 | COMP-5 |
|---|---|---|---|---|---|
| CPD1 | 20.00 | 20.00 | 20.00 | 20.00 | 20.00 |
| VEEA | 41.52 | 41.22 | 40.32 | 40.32 | 37.92 |
| TMPTA | 27.68 | 27.48 | 26.88 | 26.88 | 25.28 |
| ITX | 5.00 | 1.50 | 5.00 | 5.00 | — |
| TPO | — | 5.00 | — | — | 7.50 |
| EPD | — | 2.00 | — | — | 5.00 |
| PBZ | — | 1.00 | — | — | 2.50 |
| IRGACURE 907 | 4.00 | — | 4.00 | 4.00 | — |
| IRGACURE 369 | — | — | 2.00 | — | — |
| IRGACURE 379 | — | — | — | 2.00 | — |
| GENOSOL | 1.60 | 1.60 | 1.60 | 1.60 | 1.60 |
| BYKUVSOL | 0.20 | 0.20 | 0.20 | 0.20 | 0.20 |

TABLE 3

| wt % of component: | INV-1 | INV-2 | INV-3 | INV-4 | INV-5 |
|---|---|---|---|---|---|
| CPD1 | 20.00 | 20.00 | 20.00 | 20.00 | 20.00 |
| VEEA | 41.52 | 42.72 | 41.52 | 42.72 | 40.32 |
| TMPTA | 27.68 | 28.48 | 27.68 | 28.48 | 26.88 |
| ITX | 3.00 | 1.00 | 3.00 | 1.00 | — |
| TPO | — | — | — | — | 6.00 |
| EPD | — | — | — | — | 1.00 |
| PBZ | — | — | — | — | 1.00 |
| IRGACURE 907 | 4.00 | 4.00 | 4.00 | 4.00 | — |
| IRGACURE 369 | 2.00 | 2.00 | — | — | — |
| IRGACURE 379 | — | — | 2.00 | 2.00 | 3.00 |
| GENOSOL | 1.60 | 1.60 | 1.60 | 1.60 | 1.60 |
| BYKUVSOL | 0.20 | 0.20 | 0.20 | 0.20 | 0.20 |

On average, the radiation curable composition of the comparative radiation curable inkjet inks COMP-1 to COMP-5 and the inventive radiation curable inkjet inks INV-1 to INV-5 all contained about 49 wt % of VEEA, 33 wt % of TMPTA and 18 wt % of DPGDA.

Evaluation

The comparative radiation curable inkjet inks COMP-1 to COMP-5 and the inventive radiation curable inkjet inks INV-1 to INV-5 were coated on PET100 using a bar coater and a 10 μm wired bar. Each coated sample was cured using a Fusion DRSE-120 conveyer, equipped with a Fusion VPS/ 1600 lamp (D-bulb), which transported the samples under the UV-lamp on a conveyer belt at a speed of 20 m/min. The measured dosis by the D-Bulb was 1.57 J/cm$^2$ and a peak intensity of 8.9 W/cm$^2$. It was found that all the samples were completely cured. Subsequently, the curing speed was determined for each ink.

The CieL*a*b* parameters were determined directly after curing and again after storing the samples shielded from UV light and visible light for 24 hours in a black metal box under ambient conditions. The results are shown in Table 4.

TABLE 4

| Sample | Just Cured | | | After 1 day in dark | | |
| --- | --- | --- | --- | --- | --- | --- |
| | $L_0$ | $a*_0$ | $b*_0$ | $L_1$ | $a*_1$ | $b*_1$ |
| COMP-1 | 48.0 | −40.8 | −51.6 | 48.8 | −40.0 | −53.4 |
| COMP-2 | 48.8 | −42.0 | −50.3 | 49.5 | −40.6 | −52.9 |
| COMP-3 | 45.7 | −40.7 | −50.6 | 46.5 | −40.3 | −52.3 |
| COMP-4 | 45.1 | −39.5 | −51.3 | 45.7 | −39.3 | −52.6 |
| COMP-5 | 46.2 | −35.4 | −56.3 | 46.6 | −35.6 | −56.8 |
| INV-1 | 44.0 | −37.3 | −52.8 | 44.4 | −36.6 | −54.0 |
| INV-2 | 48.8 | −40.5 | −52.3 | 49.2 | −40.7 | −52.8 |
| INV-3 | 45.1 | −38.9 | −52.0 | 45.9 | −38.6 | −53.1 |
| INV-4 | 46.0 | −37.3 | −54.2 | 46.5 | −37.5 | −54.5 |
| INV-5 | 51.6 | −42.4 | −50.3 | 51.8 | −42.9 | −50.7 |

The comparative radiation curable inkjet inks COMP-1 to COMP-5 and the inventive radiation curable inkjet inks INV-1 to INV-5 were coated in the same manner as above on different ink receivers to evaluate their adhesion properties.

TABLE 5

| Inkjet ink | PP | PVC | PC | PMMA | PS | ALU |
| --- | --- | --- | --- | --- | --- | --- |
| COMP-1 | 1 | 0 | 0 | 5 | 0 | 0 |
| COMP-2 | 1 | 0 | 0 | 5 | 0 | 0 |
| COMP-3 | 1 | 0 | 0 | 5 | 0 | 0 |
| COMP-4 | 2 | 0 | 0 | 5 | 0 | 0 |
| COMP-5 | 3 | 1 | 0 | 5 | 0 | 0 |
| INV-1 | 1 | 0 | 0 | 5 | 0 | 0 |
| INV-2 | 2 | 0 | 0 | 5 | 0 | 0 |
| INV-3 | 0 | 0 | 0 | 4 | 0 | 0 |
| INV-4 | 1 | 0 | 0 | 5 | 0 | 0 |
| INV-5 | 1 | 1 | 0 | 5 | 0 | 0 |

The results are summarized in Table 6, wherein the adhesion score represents the sum of adhesion evaluations in Table 5. Perfect adhesion on all six substrates of Table 5 would be an adhesion score of 0, while non-adhesion on all substrates would be an adhesion score of 30. The photoyellowing values are calculated from the obtained data on the CieL*a*b* parameters of the inks in Table 4.

TABLE 6

| Inkjet ink | Curing speed | Adhesion score | Photoyellowing $\Delta E_{ab}$ |
| --- | --- | --- | --- |
| COMP-1 | 40% | 6 | 2.2 |
| COMP-2 | 40% | 6 | 3.1 |
| COMP-3 | 40% | 6 | 1.9 |
| COMP-4 | 40% | 7 | 1.5 |
| COMP-5 | 45% | 9 | 0.7 |
| INV-1 | 40% | 6 | 1.4 |
| INV-2 | 45% | 7 | 0.7 |
| INV-3 | 40% | 4 | 1.4 |

TABLE 6-continued

| Inkjet ink | Curing speed | Adhesion score | Photoyellowing $\Delta E_{ab}$ |
| --- | --- | --- | --- |
| INV-4 | 45% | 6 | 0.5 |
| INV-5 | 35% | 7 | 0.7 |

From Table 6, it is clear that an improvement for photoyellowing could be obtained while keeping curing speed and adhesion properties at least on the same level. The inkjet ink INV-5 shows that it is possible to obtain good curing speed, good adhesion and minor photoyellowing while lacking ITX as a second photoinitiator.

Example 2

This example illustrates that good adhesion on a wide variety of substrates is only obtained by using the photoinitiator including a tertiary amine group in combination with a radiation curable composition including a vinylether acrylate and a polyfunctional acrylate.

Preparation of the Pigment Dispersion CPD2

4200 g of the polymeric dispersant S35000 and 420 g of the polymerization inhibitor GENORAD™ 16 were dissolved in 11680 g of DPGDA in a vessel of 50 L. 8400 g of cyan pigment PB15:4 was added to the solution and stirred for 10 minutes using a DISPERLUX™ disperser (from DISPERLUX S.A.R.L., Luxembourg). The vessel was then connected to a Bachofen DYNOMILL ECM POLY mill having an internal volume of 8.2 L filled for 42% with 0.4 mm yttrium stabilized zirconia beads ("high wear resistant zirconia grinding media" from TOSOH Co.). The mixture was circulated over the mill for 2 hours and 31 minutes at a flow rate of about 10 L per minute and a rotation speed in the mill of about 15 m/s. During the complete milling procedure the content of the mill was cooled to a temperature of 51° C. The concentrated pigment dispersion CPD1 was discharged into another 50 L vessel. After circulating it over the mill, 5300 g of DPGDA was added to the dispersion. Finally, 4200 g of S35000 and 7800 g of DPGDA were added to complete the pigment dispersion. The resulting concentrated pigment dispersion CPD1 according to Table 7 exhibited an average particle size of 113 nm.

TABLE 7

| Component | wt % |
| --- | --- |
| PB15:4 | 20 |
| S35000 | 20 |
| GENORAD ™ 16 | 1 |
| DPGDA | 59 |

Preparation of Radiation Curable Inks

The comparative radiation curable inkjet inks COMP-6 to COMP-10 and the inventive radiation curable inkjet inks INV-6 were prepared by adding to the concentrated pigment dispersion CPD1 and mixing the components according to Table 8. The weight % (wt %) of the components were based on the total weight of the radiation curable inkjet ink.

TABLE 8

| wt % of component: | COMP-6 | COMP-7 | COMP-8 | COMP-9 | COMP-10 | INV-6 |
|---|---|---|---|---|---|---|
| CPD2 | 15.00 | 15.00 | 15.00 | 15.00 | 15.00 | 15.00 |
| DPGDA | 68.00 | 76.00 | — | — | — | — |
| SR339 | — | — | 48.00 | 56.00 | — | — |
| VCL | — | — | 20.00 | 20.00 | — | — |
| VEEA | — | — | — | — | 41.00 | 46.00 |
| TMPTA | — | — | — | — | 27.00 | 30.00 |
| EPD | 5.00 | — | 5.00 | — | 5.00 | — |
| TPO | 5.00 | — | 5.00 | — | 5.00 | — |
| ITX | 5.00 | 1.00 | 5.00 | 1.00 | 5.00 | 1.00 |
| IRGACURE 907 | — | 4.00 | — | 4.00 | — | 4.00 |
| IRGACURE 369 | — | 2.00 | — | 2.00 | — | 2.00 |
| GENOSOL | 1.80 | 1.80 | 1.80 | 1.80 | 1.80 | 1.80 |
| TEGOSOL | 0.20 | 0.20 | 0.20 | 0.20 | 0.20 | 0.20 |

Evaluation

The comparative radiation curable inkjet inks COMP-1 to COMP-5 and the inventive radiation curable inkjet ink INV-6 were coated on the substrates according to Table 9 using a bar coater and a 10 µm wired bar. Each coated sample was cured using a Fusion DRSE-120 conveyer, equipped with a Fusion VPS/I600 lamp (D-bulb), which transported the samples under the UV-lamp on a conveyer belt at a speed of 20 m/min. The measured dosis by the D-Bulb was 1.57 J/cm² and a peak intensity of 8.9 W/cm². It was found that all the samples were completed cured. The result of the adhesion test for each substrate is also shown in Table 9.

TABLE 9

| | Adhesion of ink on substrate | | | | |
|---|---|---|---|---|---|
| Inkjet ink | PP | PVC | PC | PS | ALU |
| COMP-6 | 4 | 5 | 5 | 4 | 5 |
| COMP-7 | 4 | 3 | 0 | 0 | 5 |
| COMP-8 | 5 | 5 | 0 | 0 | 5 |
| COMP-9 | 5 | 5 | 0 | 0 | 5 |
| COMP-10 | 0 | 5 | 0 | 0 | 5 |
| INV-6 | 0 | 2 | 0 | 0 | 3 |

Table 10 shows the adhesion score for each of the inkjet inks. The adhesion score represents the sum of adhesion evaluations in Table 9. Perfect adhesion on all five substrates of Table 9 would be an adhesion score of 0, while non-adhesion on all substrates would be an adhesion score of 25.

TABLE 10

| Inkjet ink | Photoinitiator including a tertiary amine group | Vinylether acrylate | Polyfunctional acrylate | Adhesion score |
|---|---|---|---|---|
| COMP-6 | No | No | No | 23 |
| COMP-7 | Yes | No | No | 12 |
| COMP-8 | No | No | No | 15 |
| COMP-9 | Yes | No | No | 15 |
| COMP-10 | No | Yes | Yes | 10 |
| INV-6 | Yes | Yes | Yes | 5 |

From Table 10, it should be clear that only a combination of a photoinitiator including a tertiary amine group and a radiation curable composition including a vinylether acrylate and a polyfunctional acrylate results in a good performance on various substrates. It can also be seen that the comparative radiation curable inkjet inks COMP-8 and to COMP-9 including more than 80 wt % of monofunctional monomers do not result in adhesion properties comparable to those obtained with the inventive radiation curable inkjet ink INV-6. Furthermore, the difficulty of making the "best possible" mixture of monomers, as discussed above in the section on the background art, is illustrated by the chosen mixture of N-vinyl caprolactam and 2-phenoxyethyl acrylate in the comparative radiation curable inkjet inks COMP-8 and to COMP-9, where good adhesion is observed on a polycarbonate substrate, but not on a PVC substrate, although N-vinyl caprolactam is known to promote adhesion on PVC substrates.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A radiation curable inkjet fluid comprising:
a radiation curable composition including at least 25 wt % of a vinylether acrylate and at least 15 wt % of a polymerizable compound including at least three acrylate groups, each wt % being based upon a total weight of the radiation curable composition; and
a photoinitiator including a tertiary amine group and 0 to 3 wt % of isopropylthioxanthone based upon a total weight of the radiation curable inkjet fluid.

2. The radiation curable inkjet fluid according to claim 1, wherein the vinylether acrylate is a radiation curable monomer represented by Formula (I):

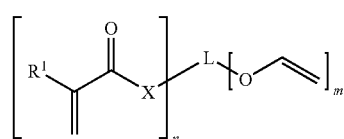

Formula (I)

wherein,
R¹ represents hydrogen, or a substituted or unsubstituted alkyl group;
L represents a linking group including at least one carbon atom;
X represents O, S, or NR² wherein R² has the same meaning as R¹; when X =NR², L
and R² may form together a ring system; and
n and m independently represent a value from 1 to 5.

3. The radiation curable inkjet fluid according to claim 2, wherein $R^1$ represents hydrogen, X represents O, and n represents a value of 1.

4. The radiation curable inkjet fluid according to claim 3, wherein the radiation curable monomer represented by Formula (I) is:

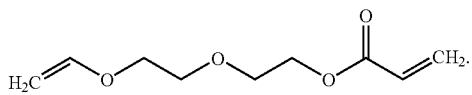

5. The radiation curable inkjet fluid according to claim 1, wherein the polymerizable compound including the at least three acrylate groups is trimethylolpropane triacrylate.

6. The radiation curable inkjet fluid according to claim 1, wherein the polymerizable compound includes 4, 5, or 6 acrylate groups.

7. The radiation curable inkjet fluid according to claim 1, wherein the photoinitiator including the tertiary amine group includes at least one morpholino group.

8. The radiation curable inkjet fluid according to claim 1, wherein the photoinitiator including the tertiary amine group includes at least one α-aminoalkylphenone group.

9. A radiation curable inkjet ink comprising:
the radiation curable inkjet fluid according to claim 1; and
a pigment dispersion including a pigment and a polymeric dispersant.

10. The radiation curable inkjet ink according to claim 9, wherein the pigment includes a β-copper phthalocyanine pigment.

11. The radiation curable inkjet ink according to claim 9, wherein the pigment includes a white pigment.

12. An inkjet printing method comprising the steps of:
providing the radiation curable inkjet fluid according to claim 1; and
applying the radiation curable inkjet fluid to a substrate.

* * * * *